United States Patent Office 3,127,434
Patented Mar. 31, 1964

3,127,434
DIHYDROVITAMIN K MONOPHOSPHATE COMPOUNDS AND PREPARATION THEREOF
Kenneth John Maynard Andrews, Harpenden, England, assignor to Hoffmann-La Roche Inc., Nutley, N.J., a corporation of New Jersey
No Drawing. Filed Oct. 10, 1960, Ser. No. 61,338
Claims priority, application Great Britain Oct. 20, 1959
3 Claims. (Cl. 260—461)

This invention relates to novel chemical processes and to novel chemical compounds obtainable thereby. More particularly, the invention relates to novel cyclic phosphates and to novel processes of making the same which involve a step of condensing a quinone with a phosphite ester.

A quick visual survey of the invention can be obtained from the following diagrammatic representation thereof.

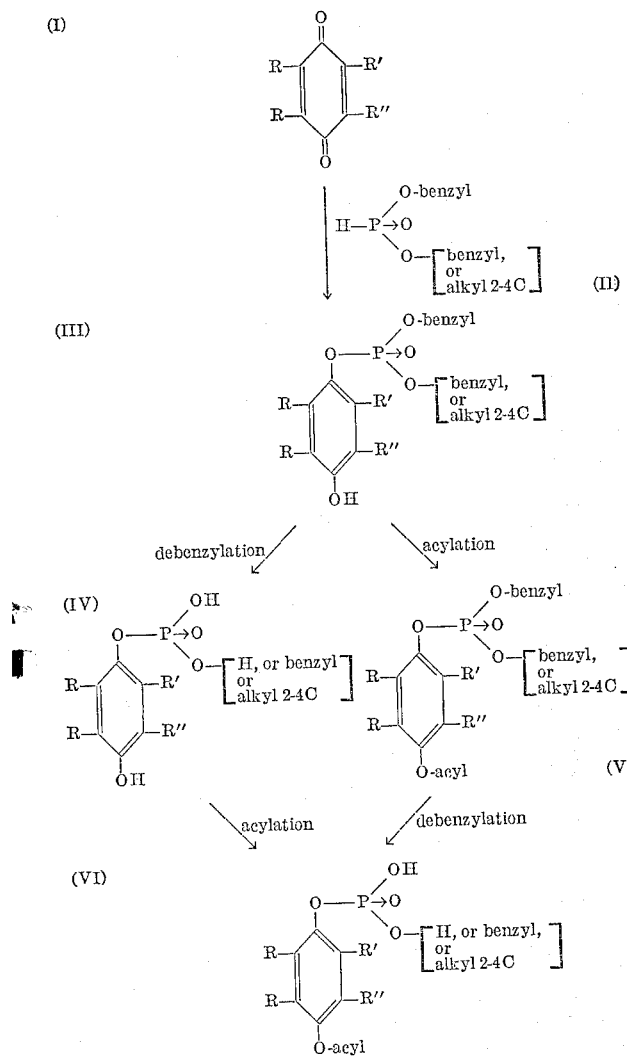

With reference to the preceding diagram, it will be seen that in a comprehensive embodiment, the invention provides a process which comprises reacting a compound of Formula I, wherein each of the symbols R represents a member selected from the group consisting of the methyl radical and the methoxy radical and the symbols R taken together represent the radical —CH=CH—CH=CH—, the symbol R' represents a member selected from the group consisting of hydrogen and the methyl radical, and the symbol R'' represents a member selected from the group consisting of radicals of the following formulas:

(VII) 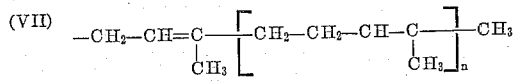

and (VIII) 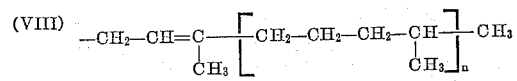

wherein $n$ in the foregoing Formulas VII and VIII represents a natural number from 0 to 9 inclusive; with a compound of the formula (IX) 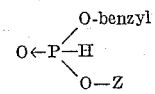

wherein Z represents a member selected from the group consisting of the benzyl radical and alkyl radicals having from 2 to 4 (inclusive) carbon atoms in the presence of a basic agent. The condensation product, represented by Formula III in the diagram, can be subjected, if desired, to successive steps of debenzylation and acylation, in any desired sequence: i.e., debenzylation followed by acylation, or acylation followed by debenzylation; or to either the debenzylation step or the acylation step singly; the "acylation" referred to being such a step as will introduce an acyl radical selected from the group consisting of lower alkanoyl and benzoyl. The sequence of process steps shown at the left of the diagram (III→IV→VI) represents an optional synthetic route in which debenzylation (III→IV) is the next succeeding step to the condensation step (I+II→III), and acylation (IV→VI) is the next succeeding step to said debenzylation step. The sequence of process steps shown at the right of the diagram (III→V→VI) represents an optional synthetic route in which acylation (III→IV) is the next succeeding step to the condensation step, the acylation step being in turn next succeeded by a denbenzylation step (V→VI).

It will be appreciated that the products of the condensation step and of the several debenzylation and acylation steps, i.e. the products represented by Formulas III, IV, V and VI, are novel, and constitute important embodiments of the invention. These novel products can be represented collectively by the formula (X) 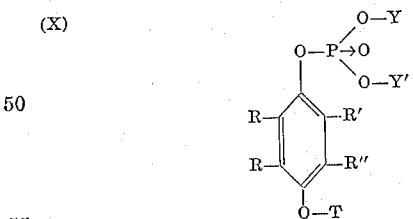

wherein the symbols R, R', and R'' have the same significance stated above, the symbol Y represents a member selected from the group consisting of hydrogen and the benzyl radical, the symbol Y' represents a member selected from the group consisting of hydrogen, the benzyl radical and alkyl radicals having from 2 to 4 (inclusive) carbon atoms, and the symbol T represents a member selected from the group consisting of hydrogen, lower alkanoyl radicals (e.g. formyl, acetyl, propionyl, etc.) and the benzoyl radical.

These starting materials for the processes of the invention constitute a known group of compounds. For example, the compounds of Formula I wherein the symbols R taken together represent the radical

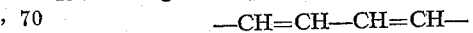

the symbol R' represents methyl and the symbol R'' represents the radical of Formula VIII, represent the vitamin K₁ series of compounds; thus, when n in Formula VIII is 3, the compound is vitamin K₁(20). Similarly, when R+R represents —CH=CH—CH=CH—, R'=methyl and R''=Formula VII, the compounds of Formula I represent the vitamin K₂ series of compounds; for example, when n=5, vitamin K₂(30). On the other hand, when R±R=methyl, R'=H, and R''=Formula VII wherein n is 8 (or, alternatively, 9), the compound of Formula I is so-called "Kofler quinone." When R±R=methoxy, R'=methyl, and R''=Formula VII, the compounds of Formula I are ubiquinones (coenzymes Q); for example, when n=9, ubiquinone (50). It will be seen, therefore, that important products of the invention are represented by the following formula:

(XI)

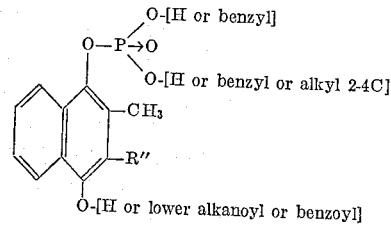

(XII)

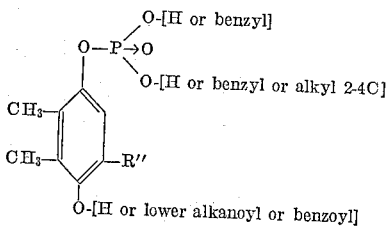

(XIII)

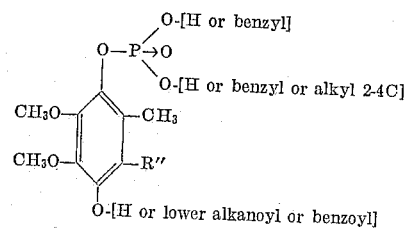

In general, the starting materials may be prepared by condensing the appropriate quinol which is unsubstituted in the 3-position with a halide of the formula R''-halogen, in which R'' has the same significance stated above, and oxidizing the condensation product to the corresponding quinone.

Advantageously, the condensation step of the processes of the invention (I+II→III) is carried out in an inert organic solvent. Acetonitrile or benzene or mixtures thereof are convenient solvents. The preferred basic agents are inorganic bases (e.g. alkali-metal alkoxides), but organic bases such as pyridine can also be used. It is convenient to use potassium tertiary butoxide as the alkali-metal alkoxide, but other alkali-metal alkoxides, e.g. sodium methoxide, may also be used. Suitably a sufficient amount of 1 N alkali-metal alkoxide solution is used to promote the reaction.

The acylation processes of the invention can be carried out by using the appropriate acid anhydride. A solvent is not ordinarily necessary, but the reaction may require initiation by addition of a small quantity of concentrated sulfuric acid. As will be apparent to those skilled in the art, the acylation step may also be carried out by other acylation processes known per se, for example, by using the appropriate acid anhydride or acid halide in pyridine.

The debenzylation step can be effected by using hydrogen in the presence of a selective hydrogenation catalyst. Suitable selective hydrogenation catalysts, for example, are those disclosed by Lindlar, Helvetica Chimica Acta, 35, 446 (1952). Palladium/charcoal catalysts can also be employed. By catalytic hydrogenation, each benzyl group present in the products III, IV or V is removed.

Alternatively, the debenzylation may be carried out anionotropically (e.g. by the use of lithium chloride), whereby only a single benzyl group in the reacted compound is removed.

The products of the invention, shown collectively in Formula X, are of interest in view of their constitution as 1-monophosphates derived from quinones which are significant in plant and animal metabolism—that is to say, such quinones as vitamin K₁, vitamin K₂, ubiquinones, and so-called "Kofler quinone" or "plant quinone." These quinones, in cases of deficiency or unusual need therefor, must be supplied to the organism in utilizable form. The novel products of the invention accordingly are useful in pharmaceutical preparations, and as additives to foodstuffs and feedstuffs, especially suited for ingestion under stress conditions; e.g. in cases under treatment with anti-bacterial drugs, or in connection with surgical procedures.

The invention is further disclosed in the following examples, which are illustrative but not limitative thereof.

*Example 1*

(a) *Dihydrovitamin K₁ 1-(dibenzyl phosphate.)*—To 4.5 g. of vitamin K₁ in a mixture of 25 ml. of acetonitrile and 15 ml. of benzene were added 3.15 g. of dibenzyl phosphite, followed by 2.5 ml. of 1 N potassium tertiary butoxide in tertiary butanol containing 10% of benzene over a period of 0.5 hour while stirring. The reaction mixture was further stirred for 1.5 hours at 20° C. and the slight precipitate filtered off. The clear solution was then evaporated in vacuo. The residual oil was dissolved in diethyl ether and washed three times with water (adding magnesium sulphate as required to break any emulsion formed). The ethereal solution was filtered and dried over magnesium sulphate. Evaporation of the ether gave crude 1-(dibenzyl phosphate) of dihydrovitamin K₁ (6.5 g.). The crude oil was partially purified by extraction with acetonitrile (77% recovery).

(b) *Dihydrovitamin K₁ 1-phosphate and its monoanilinium salt.*—A solution of 2 g. of the 1-(dibenzyl phosphate) of dihydrovitamin K₁ in 20 ml. of absolute ethanol was hydrogenated in the presence of a palladium/charcoal catalyst which had previously been shown not to affect the phytyl group. The theoretical amount of hydrogen required for the hydrogenolysis of the benzyl groups (135 ml.) was absorbed in 50 minutes. After filtration, the ethanolic solution was evaporated in vacuo and a residual oil, comprising ca. 90% of the required dihydrovitamin K₁ 1-phosphate, was obtained.

The foregoing phosphate (0.2 g.) was dissolved in dry methanol (10 ml.) and a methanolic solution of pure redistilled aniline was added to bring the pH of the solution to between 9 and 9.5. The solution was then evaporated to low bulk in vacuo, the residue diluted with diethyl ether (5 ml.) and the pH again adjusted to 9.0–9.5 by the addition of aniline. Dry acetonitrile (20 ml.) was added to the solution and the precipitate formed was separated by centrifuge—the liquid phase was discarded. The white solid was then suspended in dry acetonitrile to remove any excess of aniline and again separated by means of the centrifuge and decantation of the liquid phase. On drying the residual solid in a desiccator over phosphorus pentoxide for 48 hours, the monoanilinium salt of dihydrovitamin K₁ 1-phosphate was obtained as an amorphous solid.

(c) *Dihydrovitamin K₁ 1-(dibenzyl phosphate)-4-acetate.*—2.25 g. of dihydrovitamin K₁ 1-(dibenzyl phosphate) was suspended in 9 ml. of acetic acid anhydride and 2 drops of concentrated sulphuric acid added while shaking the suspension. All the oil dissolved and, after 2 hours, the solution was poured on to ice. The precipitated oil was extracted with benzene and the benzene extract was washed with water, twice with sodium hydrogen carbonate solution and again with water. The washed extract was clarified by passing through a fluted filter paper and it was then evaporated in vacuo. Drying was completed by addition of acetonitrile and evaporation in vacuo. The residual dihydrovitamin $K_1$ 1-(dibenzyl phosphate)-4-acetate (2.2 g.) was completely soluble in acetonitrile (unlike the starting material).

(d) *Dihydrovitamin $K_1$ 1-phosphate-4-acetate.*—A solution of the foregoing 4-acetoxy compound in 25 ml. of absolute ethanol was hydrogenated as described in (b). 136 ml. of hydrogen were absorbed (theoretical=140 ml.). After filtration, the ethanol was evaporated in vacuo and the residue (1.5 g.) was then an oil comprising ca. 90% of the required dihydrovitamin $K_1$ 1-phosphate-4-acetate.

*Example 2*

(a) *Dihydrovitamin $K_2$ (10) 1-(dibenzyl phosphate).*—1.54 g. vitamin $K_2$ (10) was dissolved in 5 ml. benzene, the solution was stirred and 1.43 g. dibenzyl phosphite in 1 ml. benzene was added, followed by 0.25 ml. 1 N potassium tertiary butoxide in tertiary butanol-10% benzene. The reaction mixture became warm and, after stirring for 2 hours, a further 0.25 ml. 1 N potassium tertiary butoxide solution was added but there was no evidence of further reaction. The reaction mixture was diluted with ether, a little solid material was removed by filtration and the solution was washed with 0.02 N hydrochloric acid and three times with water. The solution was dried over magnesium sulphate and evaporated, leaving an oily residue of 2.14 g. of dihydrovitamin $K_2$ (10) 1-(dibenzyl phosphate).

(b) *Dihydrovitamin $K_2$ (10) 1-phosphate and its monoammonium salt.*—1.93 g. dihydrovitamin $K_2$ (10) 1-(dibenzyl phosphate) was dissolved in ethanol 200 mg. palladium/(barium sulphate) catalyst and 300 mg. charcoal were added and the mixture was set aside 15 hours. After filtration the solution was hydrogenolysed during 8 hours with the addition of 200 mg. Lindlar catalyst [Helvetica Chimica Acta, 35, 450 (1952)] and three further 200 mg. additions of catalyst at intervals. 82% of the theoretical volume of hydrogen had been absorbed when the uptake ceased. After removal of the catalyst by filtration the solution was evaporated and the residual oil was taken in water and lithium hydroxide solution was added to pH 8.5. The insoluble part was extracted with ether and the aqueous solution was made acid by the addition of dilute hydrochloric acid and the free acid ester was extracted with ether. The ethereal solution was washed with water, dried (magnesium sulphate) and evaporated to give 0.64 g. of dihydrovitamin $K_2$ (10) 1-phosphate as a pale yellow oil.

A solid monoammonium salt was prepared by adding methanolic ammonia to the solution of the oil in ether and precipitating the salt with acetonitrile. A paper chromatogram [Whatman 3 M.M. paper dipped in 10% silicone fluid in petrol, dried and the solvent 60 isopropanol:37.5 water:2.5 acetic acid (parts by volume) descending 16 hours at room temperature], of the monoammonium salt showed one main spot, $R_f$ 0.88, which was visible under ultraviolet light and contained phosphate. In addition there were two small phosphate impurity spots of $R_f$ 0.76 and 0.50.

*Example 3*

(a) *Ubiquinol(50) dibenzyl phosphate.*—0.65 g. ubiquinone(50) was dissolved in 1 ml. benzene, the solution was stirred and 0.24 g. (1.2 equivs.) of dibenzyl phosphite in 0.5 ml. benzene was added, followed by 0.1 ml. 1 N potassium tertiary butoxide in tertiary butanol-10% benzene. The solution became warm and practically decolorized. After stirring the reaction mixture for an hour it was diluted with ether and washed with water, 0.02 N hydrochloric acid and finally water. The ethereal solution was dried over magnesium sulphate, filtered and evaporated, finally in vacuo. The residue, after trituration with acetonitrile, was dried in vacuo over phosphorus pentoxide, giving 0.74 g. of a colorless oil which slowly crystallized on standing. These waxy crystals of ubiquinol(50) dibenzyl phosphate had a melting point 37°–45° C.

(b) *Ubiquinol(50) dihydrogen phosphate.*—460 mg. of the dibenzyl phosphate was dissolved in 5 ml. of absolute ethanol and stool over 80 mg. of palladium/charcoal for 1 hour. After filtration the solution was hydrogenated using 120 mg. Lindlar catalyst (palladium on barium sulphate poisoned with lead acetate). 18.5 ml. of the theoretical 19.6 ml. hydrogen were absorbed in about 3 hours. The hydrogenated solution was filtered and evaporated when 0.26 g. of colorless, oily ubiquinol dihydrogen phosphate was obtained which crystallized slowly in the refrigerator. The waxy crystals had melting point ca. 40° C., were soluble in 2 N sodium hydroxide solution and gave a single spot $R_f$ 0.86, visible under ultraviolet light and phosphate containing on a paper chromatogram. [Whatman No. 1 paper dipped in 10% silicone fluid in petrol, dried and the solvent 2 ethanol:1 water:1 acetic acid (parts by volume) allowed to ascend 16 hours.] Ultraviolet light absorption (in ethanol):$\lambda$ min. 250 m$\mu$ ($\epsilon$ 370), $\lambda$ max. 282 m$\mu$ ($\epsilon$ 2,280).

(c) *Ubiquinol(50) 1-(dihydrogen phosphate)-4-acetate.*—200 mg. ubiquinol dibenzyl phosphate was dissolved in 1 ml. dry pyridine, 0.5 ml. acetic anhydride was added and the solution was set aside 4 hours. The solution was then diluted with ether and washed twice with water, twice with dilute hydrochloric acid and finally with water. After drying the ethereal solution over magnesium sulphate, it was filtered and evaporated (finally in vacuo), giving an oily residue of 160 mg. ubiquinol(50) acetate 1-(dibenzyl phosphate). The IR spectrum showed loss of the hydroxyl band and the appearance of a carbonyl (acetate) band at 1760 cm.$^{-1}$.

150 mg. of the ubiquinol(50) 1-dibenzyl phosphate)-4-acetate was taken in 3 ml. absolute ethanol and hydrogenolysed using a palladium/charcoal catalyst insufficiently active to cause hydrogenation of the unsaturated hydrocarbon chain. The theoretical volume of hydrogen was absorbed in ca. 1 hour. The catalyst was filtered off and washed with ether and the filtrate and washings were evaporated (finally in vacuo), giving a residue of 95 mg. of oily ubiquinol(50) 1-phosphate-4-acetate.

*Example 4*

(a) *Dihydrovitamin $K_1$ (20) 1-(dibenzyl phosphate).*—6.2 g. vitamin $K_1$ (20) was dissolved in 60 ml. benzene. The solution was stirred and 4.4 g. dibenzyl phosphite was added followed by 0.7 ml. 1 N potassium tertiary butoxide in tertiary butanol/(10% benzene). The reaction mixture became warm and, after 1 hour, it was filtered, diluted with ether and washed with water 0.02 N hydrochloric acid and finally twice with water. The solution was dried over magnesium sulphate, filtered and evaporated and the residual oily dihydrovitamin $K_1$ (20) 1-(dibenzyl phosphate) was triturated twice with acetonitrile and finally dried in vacuo over phosphorus pentoxide. 6.7 g. (68% yield) of yellow oil was obtained.

(b) *Dihydrovitamin $K_1$(20) 1-phosphate and its anilinium salt.*—2 g. of dihydrovitamin $K_1$(20) 1-(dibenzyl phosphate) was dissolved in 20 ml. absolute ethanol and hydrogenolysed using 200 mg. of a 10% palladium/charcoal catalyst with an activity which would not cause hydrogenation of dihydrovitamin $K_1$(20) at an appreciable rate. The theoretical volume (135 ml.) of hydrogen was absorbed in 50 minutes. After filtration the solvent was evaporated leaving an oily, acid residue of 1.4 g. dihydrovitamin $K_1$(20) 1-(dihydrogen phosphate). A paper chromatogram [details as for ubiquinol(50) 1-phosphate] showed one main spot, visible under ultraviolet light and phosphate containing, $R_f$ 0.88, a faint 1 inch long streak extending from the origin and a small faint phosphate impurity spot $R_f$ 0.62.

An anilinium salt of good purity could be prepared by adding aniline in methanol, to pH 9, to the methanolic solution of the acid ester, evaporating the solution and purifying the residue by several precipitations with acetonitrile from methanol solution.

(c) *Dihydrovitamin $K_1$ (20) 1-(dibenzyl phosphate)-4-benzoate.*—2 g. dihydrovitamin $K_1$ (20) 1-(dibenzyl phosphate) was dissolved in 5 ml. pyridine and 0.5 ml. benzoyl chloride was added. The reaction mixture was set aside for 2 hours, diluted with ether and, after filtering off the precipitated hydrochloride, the ethereal solution was washed with water, twice with dilute sodium hydroxide solution and finally twice with water. Evaporation of the dried (magnesium sulphate) ethereal solution gave 2.04 g. of dihydrovitamin $K_1$ (20) 1-(dibenzyl phosphate)-4-benzoate as a yellow oil.

(d) *Dihydrovitamin $K_1$ (20) 1-phosphate-4-benzoate.*—0.8 g. of the foregoing oil was taken in 8 ml. absolute ethanol and hydrogenolysed with 80 mg. of a palladium/charcoal catalyst which had previously been found not to cause hydrogenation of dihydrovitamin $K_1(20)$ benzoate. 45.5 ml. of the theoretical 47 ml. of hydrogen were absorbed in 2 hours and then the absorption virtually ceased. Evaporation of the filtered solution gave 0.64 g. of oil which was substantially dihydrovitamin $K_1$ (20) 1-phosphate-4-benzoate. To obtain pure material, part of the oil was dissolved in ether, the ethereal solution was extracted with very dilute sodium hydroxide solution and the alkaline extract was quickly acidified with dilute hydrochloric acid. An oil precipitated which was extracted with ether. After washing the ethereal solution with water it was dried (sodium sulphate) and evaporated to give the acid ester, which then gave a single phosphate containing spot $R_f$ 0.925 on a paper chromatogram. [Whatman 3 M.M. paper dipped in 10% silicone fluid in petrol, dried and the solvent 60 isopropanol:37.5 water:2.5 acetic acid (parts by volume) descending 16 hours at room temperature.]

(e) *Dihydrovitamin $K_1$ (20) 1-(dibenzyl phosphate)-4-acetate.*—7.8 g. dihydrovitamin $K_1$ (20) 1-(dibenzyl phosphate) was dissolved in 30 ml. acetic anhydride and 2–3 drops concentrated sulphuric acid were added [the acetic anhydride/pyridine method as used for the ubiquinol(50) acetate 1-phosphate could also be used for this acetylation]. The solution became slightly warm and lighter in color and, after it had been set aside for 3 hours, 150 ml. water was added and the mixture was allowed to stand for a further 2 hours. The product was extracted twice with 60 ml. of benzene and the benzene was washed with water, sodium bicarbonate solution and finally water. After drying the benzene solution (magnesium sulphate), the benzene was evaporated and a residue of 7.4 g. dihydrovitamin $K_1$ (20) 1-(dibenzyl phosphate)-4-acetate remained as a light brown oil.

(f) *Dihydrovitamin $K_1(20)$ 1-phosphate-4-acetate.*—The 7.4 g. dihydrovitamin $K_1(20)$ 1-(dibenzyl phosphate)-4-acetate was dissolved in 7.0 ml. ethanol and hydrogenolysed with 0.4 g. of a palladium/charcoal catalyst which had previously been found not to cause hydrogenation of dihydrovitamin $K_1(20)$ acetate. Absorption of hydrogen ceased after 433 ml. of the theoretical 471 ml. for hydrogenolysis had been absorbed in 2.25 hours. After removal of the catalyst by filtration, the solution was evaporated in vacuo giving 5.4 of the dihydrovitamin $K_1(20)$ 1-phosphate-4-acetate as a light brown acid oil. A paper chromatogram [details as for ubiquinol(50) 1-phosphate, except that Whatman No. 4 paper was used] showed one main spot, $R_f$ 0.8, visible under ultraviolet light and phosphate containing, a small faint phosphate impurity spot $R_f$ 0.63 and a faint streak $R_f$ 0–0.35 corresponding to vitamin $K_1$-like material.

*Example 5*

*Dihydrovitamin $K_1(20)$ 1-(ethyl phosphate).*—2.5 g. vitamin $K_1(20)$ was dissolved in 25 ml. benzene, the solution was stirred and 12 g. ethyl benzyl phosphite was added followed by 1.0 ml. of 0.4 N potassium tertiary butoxide in (tertiary butanol)/(10% benzene). The solution became warm and changed from an orange color to a pale yellow. The reaction mixture was set aside for 2 hours at room temperature and was then washed with water (a little sodium sulphate solution was added to disperse the emulsion formed). The benzene layer was separated, filtered and dried over anhydrous sodium sulphate. The solution was filtered and the filtrate was evaporated in vacuo giving 3.14 g. (87% yield) of dihydrovitamin $K_1(20)$ 1-(ethyl benzyl phosphate) as a yellow oil. The oil was dissolved in ethanol (25 ml.) and hydrogenolysed using 0.2 g. of a palladium/charcoal catalyst which would not cause hydrogenation of dihydrovitamin $K_1(20)$ at an appreciable rate. The theoretical volume of hydrogen (117 ml.) was absorbed in 1.25 hours. The catalyst was filtered off and the filtrate was evaporated in vacuo leaving 2.54 g. of oil. A paper chromatogram indicated that this was largely the required product but to purify the oil it was dissolved in ether and the solution was extracted twice with dilute potassium hydroxide solution. The aqueous extracts were acidified with dilute hydrochloric acid and then extracted with ether. The ethereal extracts were washed with water, dried (magnesium sulphate) and evaporated to give a light yellow acid oil which on a paper chromatogram gave a single spot visible under ultraviolet light and containing phosphate; $R_f$ 0.92.

I claim:
1. Dihydrovitamin $K_2$ 1-monophosphate.
2. Dihydrovitamin $K_1$ 1-dibenzylmonophosphate.
3. Dihydrovitamin $K_1$ 1-dibenzylmonophosphate-4-lower alkanoate.

References Cited in the file of this patent

UNITED STATES PATENTS

| | | |
|---|---|---|
| 2,407,823 | Fieser | Sept. 17, 1946 |
| 2,849,480 | Kreuchunas | Aug. 26, 1958 |
| 2,913,477 | Hirschmann | Nov. 17, 1959 |
| 2,935,518 | Reetz | May 3, 1960 |
| 2,962,519 | Folkers et al. | Nov. 29, 1960 |
| 3,051,738 | Hirschmann | Aug. 28, 1962 |

FOREIGN PATENTS

| | | |
|---|---|---|
| 937,956 | Germany | Jan. 19, 1956 |

OTHER REFERENCES

Fieser et al.: "Organic Chemistry," 3rd ed., pp. 1017–8 (1956) (Reinhold).

UNITED STATES PATENT OFFICE
CERTIFICATE OF CORRECTION

Patent No. 3,127,434                                    March 31, 1964

Kenneth John Maynard Andrews

It is hereby certified that error appears in the above numbered patent requiring correction and that the said Letters Patent should read as corrected below.

Column 2, lines 3 to 6, formula (VII) should appear as shown below instead of as in the patent:

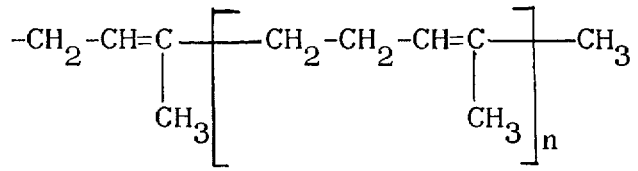

column 3, lines 8 and 10, for "R+R", each occurrence, read -- R=R --; column 6, line 5, for "stool" read -- stood --; line 34, for "1-dibenzyl" read -- 1-(dibenzyl --.

Signed and sealed this 3rd day of November 1964.

(SEAL)
Attest:

ERNEST W. SWIDER                               EDWARD J. BRENNER
Attesting Officer                                Commissioner of Patents